United States Patent [19]

Kodric

[11] Patent Number: 4,818,181
[45] Date of Patent: Apr. 4, 1989

[54] WIND TURBINE

[76] Inventor: Andrej A. Kodric, 22 Evangeline Court, Rexdale, Ontario, Canada, M9V 4V2

[21] Appl. No.: 143,381

[22] Filed: Jan. 11, 1988

[51] Int. Cl.⁴ ................................................ F01D 5/12
[52] U.S. Cl. ............................ 416/196 A; 416/132 B; 416/135
[58] Field of Search ........... 416/132 B, 135 A, 175 A, 416/196 A, 139 A, 210 A, 194 R, 194 A

[56] References Cited

U.S. PATENT DOCUMENTS

| | | | |
|---|---|---|---|
| 399,171 | 3/1889 | Townsend | 416/139 A |
| 542,305 | 7/1895 | Fuller | 416/139 A |
| 2,015,777 | 10/1935 | Belding | 416/132 B |
| 4,116,585 | 9/1978 | Maracic | 416/135 A |
| 4,439,108 | 3/1984 | Will | 416/135 A |
| 4,673,822 | 6/1987 | Kikuchi | 416/132 B |

FOREIGN PATENT DOCUMENTS

| | | | |
|---|---|---|---|
| 636277 | 4/1928 | France | 416/135 A |
| 2303967 | 10/1976 | France | 416/132 B |
| 148978 | 11/1980 | Japan | 416/135 A |

Primary Examiner—Robert E. Garrett
Assistant Examiner—John T. Kwon
Attorney, Agent, or Firm—Ridout & Maybee

[57] ABSTRACT

The invention relates to a wind turbine having arm members each comprising an inner and outer portion at an angle of near 90°. A vane is pivotally attached to each outer arm portion and biased at a desired pitch angle to the inner arm portion. Springs are provided to allow the vanes to move toward a neutral wind position when high wind conditions threaten the integrity of the structure.

18 Claims, 5 Drawing Sheets

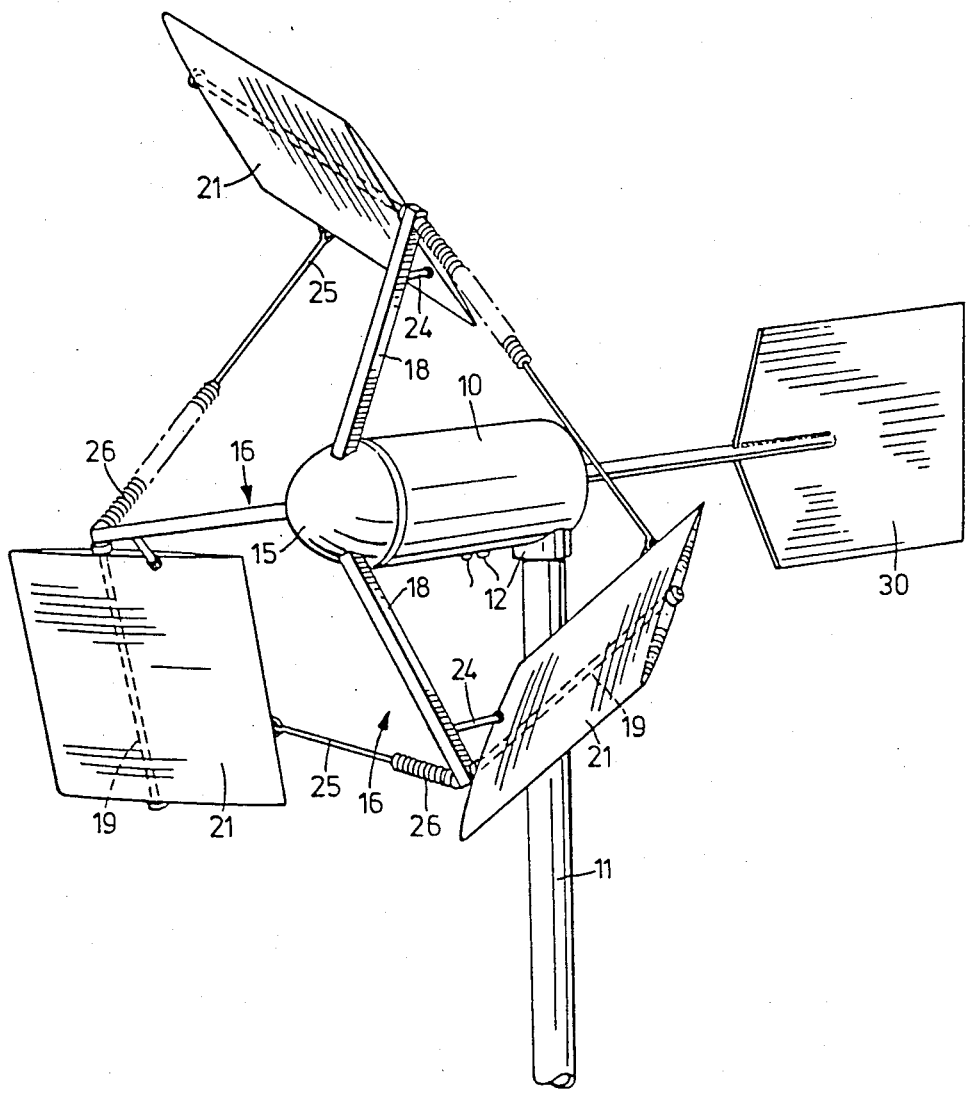
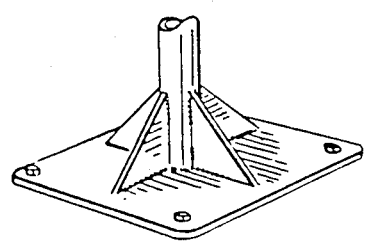
FIG. 1

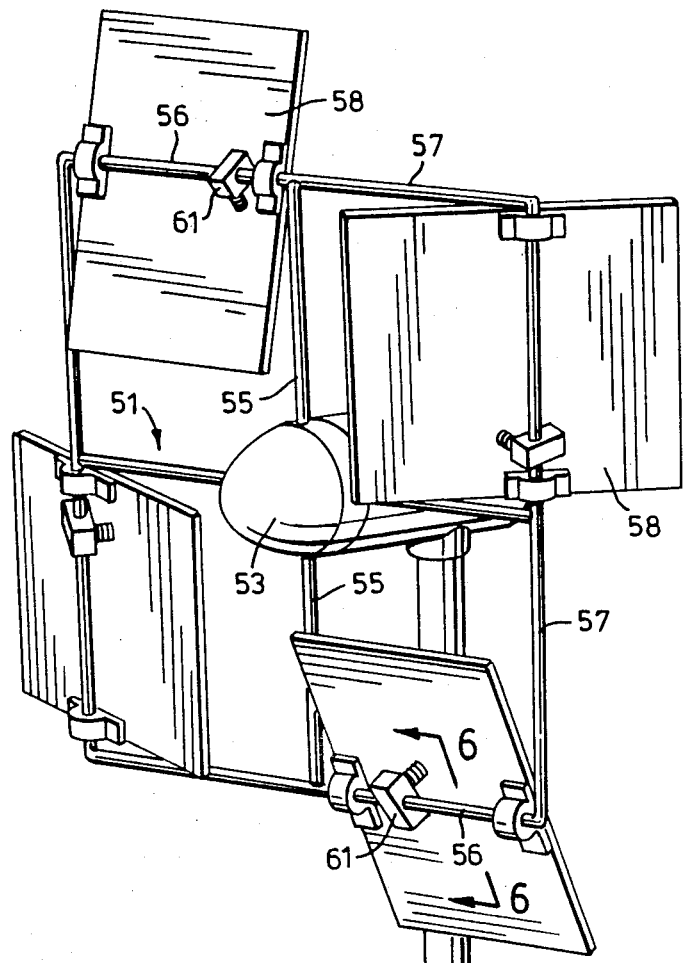
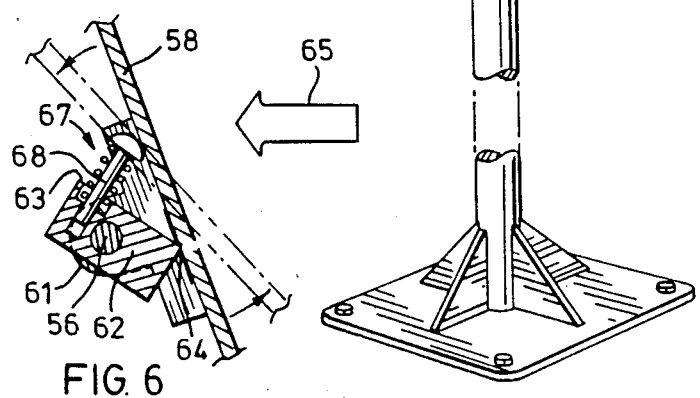

WIND TURBINE

The present invention relates to a wind turbine which rotates about a generally horizontal axis. The invention is intended for use in generating electricity, but may also find applications in other areas.

The invention is designed to be made from readily available materials and is thus, inexpensive to construct and maintain. The vanes of the present wind turbine are biased to the most favourable pitch angle for maximizing the power derivable from the available wind. However, the biasing means are designed to allow the vanes to move toward a neutral wind position when the force of the impinging wind becomes dangerously high.

Accordingly, the present invention provides a wind turbine comprising a housing pivotally positioned atop a support structure. A mechanism is located within the housing for utilizing rotational energy derived from the wind. The mechanism has a hub rotatably positioned at one end of the housing, and at least two arm members are attached to the hub and radiate outwardly therefrom. The arms are spaced equally from one another, and each arm has an inner arm portion and an outer arm portion at an angle to the inner portion. The arm members are oriented in a substantially vertical plane. A vane is pivotally attached to each outer arm portion, and means for orienting the pitch of each vane is provided so that each vane may catch the wind to impart rotation to the hub. Means are also provided for orienting the housing about the support structure so that the vanes may catch the wind.

BRIEF DESCRIPTION OF THE DRAWINGS

FIG. 1 is a perspective view of a preferred wind turbine having three arms;

FIG. 5 is a perspective view of a second preferred embodiment having four arms attached to the central hub;

FIG. 6 is a detail along line 6—6 of FIG. 5 showing the spring loaded wind release means associated with the vanes of this embodiment.

As shown in FIG. 1, the preferred wind turbine comprises a housing 10 which contains means for translating the rotational energy of the turbine into electricity or other useful energy. Thus, the housing 10 may contain a transmission for receiving rotational input from the turbine and an electric generator receiving the output from the transmission. The housing 10 is situated atop a support structure 11, which may be a column as shown in FIG. 1 or other suitable structure. The housing 10 is provided with means 12 to enable it to pivot about a vertical axis running therethrough in response to changes in wind direction. This pivotal means 12 does not form a part of the invention, and may be any of a number of configurations known to those skilled in the art.

A hub 15 is located at one end of the housing 10, and is connected to the means contained within the housing for translating the rotational energy of the turbine into electrical or other useful energy. The hub 15 has at least two arm members 16 attached thereto, and these arms 16 radiate outwardly from the hub 15 in the same plane. The plane of the arm members 16 is oriented substantially vertically for the purpose of catching the force of a substantially horizontally blowing wind. As a practical matter, the number of arm members 16 is two to five depending on the application and anticipated wind conditions. FIG. 1 shows three arm members 16, but this is for convenience only and should not be taken as a restriction of the scope of the present invention.

Figure 3:
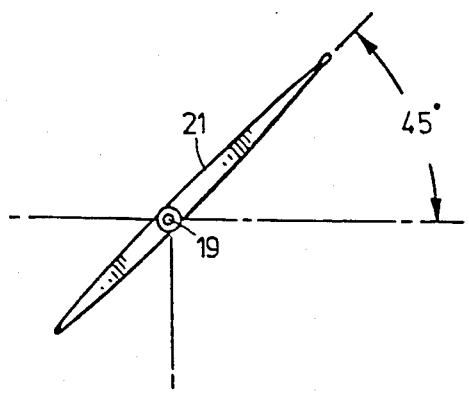
FIG. 3 is a detail showing the pitch angle of a vane.
Figure 2:
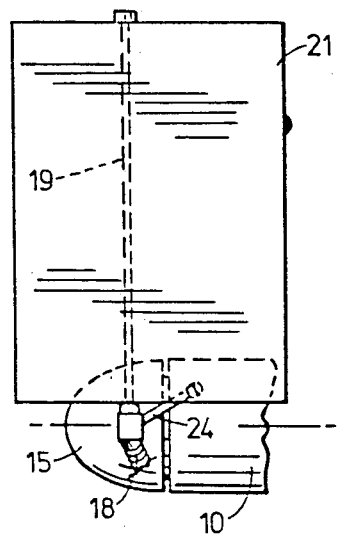
FIG. 2 is a detailed elevational view of the turbine of FIG. 1, showing the attachment of a vane to an arm.

The arm members 16 comprise an inner arm portion 18 and an outer arm portion 19 attached at an angle to the inner portion 18 of from 75° to 105°. Preferably, the angle between the inner and outer arm portions 18 and 19 is 90°. An angle of slightly less than 90° will cause the turbine to rotate faster but will also cause a decrease in the power captured by the turbine. Preferably, the inner and outer arm portions 18 and 19 are of approximately the same length, and each arm member 16 is identical. When the outer arm portion 19 is shorter than the inner portion 18, less power is captured from the available wind. However, when the length of the outer portion 19 is longer by about 10% than the length of the inner portion 18, the stress on the structure of the arm member 16 becomes unacceptably high. Thus, in order to strike a compromise between power derived from the wind and acceptable stress to the structure of the arms 16, it is preferred that the portions 18 and 19 be approximately equal in length. Constructed in this manner, the arms 16 do not require special high strength materials or special reinforcing elements, but can be constructed from readily available and low cost materials suitable for the relatively moderate forces anticipated.

A vane 21 is attached pivotally to each outer arm portion 19 and may be of various shapes, but a simple rectangular vane 21 as shown in the drawings is preferred. The vanes 21 may be aerodynamically tapered toward the outer edges thereof as shown in FIG. 1, or they may be simple planar structures. The vanes 21 may be mounted symmetrically on the outer arm portion 19 or may be offset slightly so that a larger portion of the vane 21 extends inwardly toward the hub 15. As shown in FIGS. 1 and 3, each vane 21 is biased at an angle of about 45° to the inner arm portion 18 by at least one stop 24 extending from the inner portion 18 and by a cable or arm 25 and spring 26 combination, one end of which is attached to the inner portion of the vane 21 and the other end of which is attached to the arm member 16 next adjacent near the junction of the inner and outer portions 18 and 19. It is preferred that the stops 24 be adjustable to at least a small extent. The arm 25 and spring 26 may, of course, be configured in relation to the vane 21 in any of several ways, and the mode shown in the drawings is but one manner which is preferred. Clearly, when the turbine has but two arms 16, this arrangement for the arm 25 and spring 26 would not be feasible. In such a case additional inner arm portions 18 might be added to provide structure for the attachment of the arm 25 and spring 26 biasing means. Other equally suitable arrangements will be apparent to those skilled in the art having a full appreciation of the present invention.

The 45° angle for the pitch of the vanes 21 gives the optimum transfer of power from a wind impinging horizontally onto the vertically oriented hub 15 and arm members 16. The mounting of the vanes 21 asymmetrically so that a larger portion thereof extends in toward the hub 15 allows the vanes 21 to more easily maintain the desired pitch angle, since the larger heavier portion of each vane 21 is pushed inwardly by the impinging wind against the counteracting force of the spring 26. When the force of the wind becomes too large so as to endanger the integrity of the structure, the vanes 21 will rotate toward a neutral wind position, i.e., counter to the force of the spring 26, thereby preventing damage to the turbine. Clearly, the pitch angle of the vanes 21 will vary slightly depending on the force of the wind. The stop 24 may be adjusted to provide a pitch angle of slightly less than 45° for calm conditions so that when the wind commences the force against the vanes 21 will cause a slight rotation thereof against the pull of the springs 26 and thereby causing the vanes to move toward the 45° optimum pitch angle. This tuning of the vanes to accommodate the particular conditions of the site in which the turbine is located should be apparent to those skilled in this art.

Figure 4:
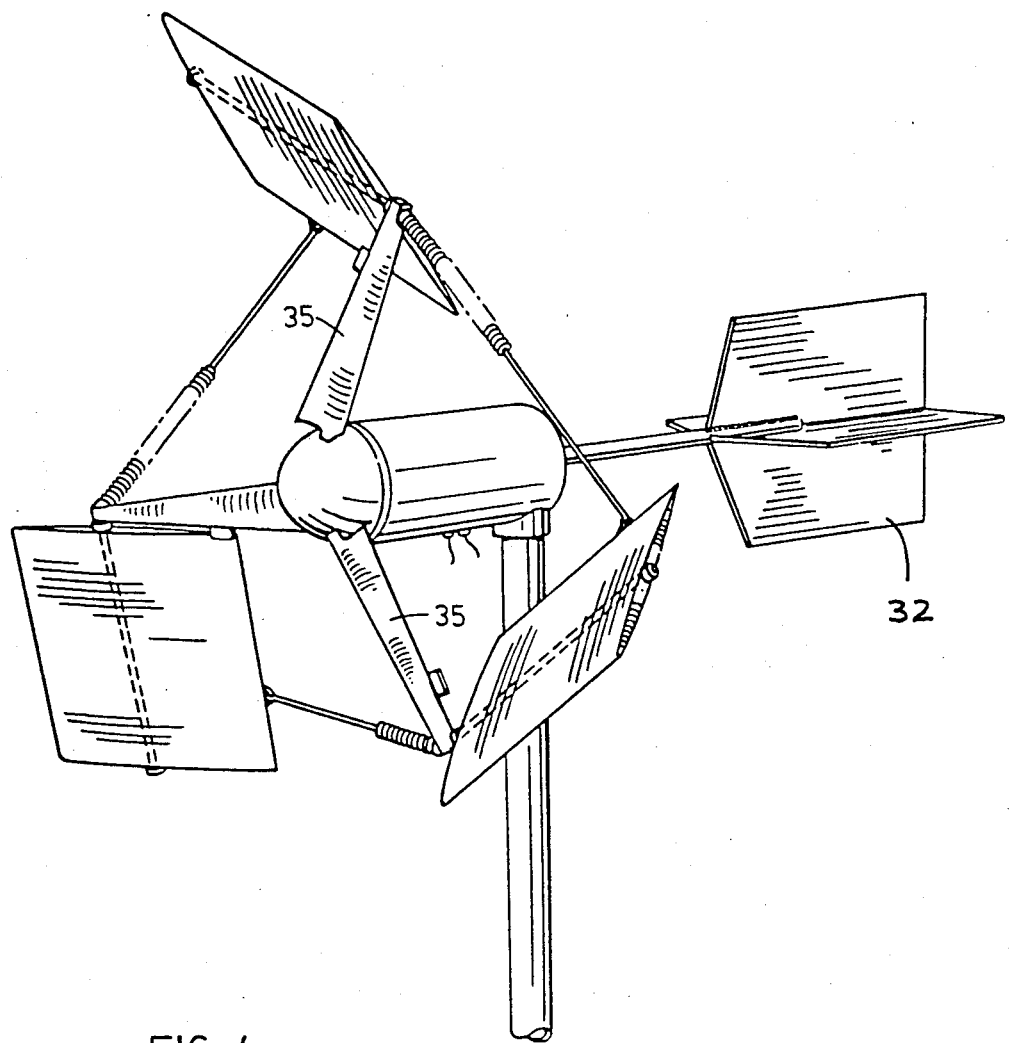
FIG. 4 is a perspective view of an alternative structure having wind catching inner arm portions.

Proper horizontal orientation of the turbine so that it faces either into or down wind, may be provided to the structure by any of a number of known means. FIG. 1 shows the use of a vertical tail 30 attached to the housing 10 opposite the hub 15. The tail 30 acts to rotate the housing 10 about the support structure 11 so that the hub 15 and arms 16 face into the wind. FIG. 4 shows a tail 32 of an alternate construction having both vertical and horizontal planar members which may be more suitable depending on the particular local wind conditions.

As shown in FIG. 4, the present wind turbine may incorporate additional features such as the addition of inner vane members 35 for the inner arm portions 18. These inner vanes 35 are preferably aerodynamically shaped tapering from the hub 15 to the outer end of the inner arm portion 18. The inner vanes 35 are pitched permanently so as to catch the impinging wind to impart rotation to the turbine. An appropriate pitch angle for most applications would be about 30° from the vertical plane.

Figure 7:
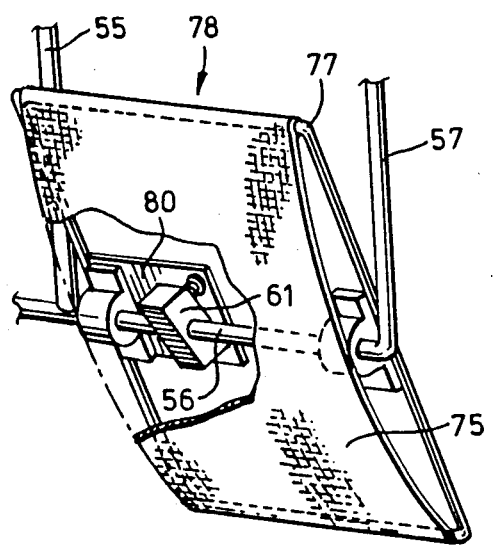
FIG. 7 is a detail perspective view of an alternative vane construction.

A second preferred embodiment is shown in FIGS. 5–7, wherein a wind turbine according to the invention comprises four arms 51 radiating from a hub 53. Each arm 51 has an inner arm portion 55 and an outer arm portion 56. Each arm 51 is also provided with a brace member 57 extending between the end of each outer arm portion 56 and the junction of the next adjacent inner and outer arm portions 55 and 56.

A vane 58 is pivotally attached to each outer arm portion 56, and is angled to catch the wind by a combination stop and release means 61 which is adjustably affixed to each outer arm portion 56. As with the embodiment first described above, the vane 58 is preferably asymmetrically attached to the outer arm portion 56 so that a larger portion extends inwardly toward the hub 53.

The stop and release means 61 is shown in greater detail in FIG. 6. The body 62 of the means 61 is fixed on the outer arm portion 56 by any suitable means. Preferably, the angle of the body 62 about the outer arm portion 56 is adjustable. The orientation of the vane 58 on the outer arm portion 56 is defined by the fixed means 61. The body 62 is provided with a biasing means 67 near one edge 63 which urges the vane 58 to engage an opposing edge 64 of the fixed body 62. This orientation is shown in solid lines in FIG. 6, the wind coming from the right (arrow 65). As the wind force increases, the asymmetrical attachment of the vane 58 to the outer arm portion 56 causes the vane 58 to pivot away from the edge 64 of the body 62 against the countervailing force of the biasing means 67 (broken lines in FIG. 6). As shown, the biasing means 67 may comprise a spring loaded pin 68.

Pivoting of the vane 58 against the biasing means 67 causes less of the wind force to be captured by the vane 58. This feature has a moderating effect on the rotation of the turbine, tending to encourage the turbine to rotate at a relatively constant rate under varying wind conditions. In extremely high winds, the biasing means 67 will allow each vane 58 to pivot sufficiently to release virtually all of the wind force acting on it. This feature provides an automatic safety mechanism for the turbine which otherwise might be damaged in high winds.

While the shape of the vanes 58 in this second preferred embodiment may be planar, as shown in FIGS. 5 and 6, or aerodynamically curved, such as shown in FIGS. 1–4, the vanes in accordance with the invention may be made of a strong sheet material 75 attached to a frame 77 as shown in FIG. 7 to provide a vane 78 which catches the wind like a sail. The frame 77 shown in FIG. 7 is made according to the second preferred embodiment with a surface 80 for engaging the combination stop and release means 61 described above.

From the foregoing it will be apparent to the person skilled in this art that a number of variations may be made to the embodiment particularly described herein, which variations are also included within the scope of this invention.

I claim:

1. A wind turbine comprising:
   a housing pivotally positioned atop a support structure;
   hub rotatably positioned at one end of the housing;
   at least two arm members being attached to and radiating outwardly from the hub and being spaced equally from one another, the arm members each having an identical structure comprising an inner arm portion and an outer arm portion at an angle of from 75° to 105° to the inner portion, the arm members being oriented in the same substantially vertical plane;
   a vane being pivotally attached to each outer arm portion;
   means for biasing the pitch angle of each vane about its outer arm portion to catch the wind and thereby impart rotation to the hub; and
   means for orienting the housing so that the vanes may catch the wind.

2. A wind turbine as claimed in claim 1, wherein the number of arm members is at least two but no more than five.

3. A wind turbine as claimed in claim 1, wherein the inner and outer arm portions are of approximately equal length.

4. A wind turbine as claimed in claim 1, wherein the inner and outer arm portions form an angle to one another of 90°.

5. A wind turbine as claimed in claim 1, wherein each vane is planar and rectangular in shape.

6. A wind turbine as claimed in claim 1, wherein each vane has outer longitudinal edges and is tapered aerodynamically toward said edges.

7. A wind turbine as claimed in claim 1, wherein each vane is mounted on an outer arm portion so that a larger portion of the vane extends inwardly toward the hub.

8. A wind turbine as claimed in claim 1, wherein the biasing means comprises at least one stop extending from the inner arm portion to the vane and spring means for biasing the vane against the stop.

9. A wind turbine as claimed in claim 8, wherein the spring means comprises a spring and arm attached thereto, the arm also being attached to the vane.

10. A wind turbine as claimed in claim 8, wherein the spring means permits rotation of the vane toward a neutral wind position under high wind conditions.

11. A wind turbine as claimed in claim 8, wherein the stop and spring means are adjustable thereby permitting a tuning of the vanes of the turbine in accordance with expected wind conditions.

12. A wind turbine as claimed in claim 1, wherein the means for orienting the housing comprises a vertical tail attached thereto opposite the hub.

13. A wind turbine as claimed in claim 1, wherein the means for orienting the housing comprises a tail having both vertical and horizontal planar members, the tail being attached to the housing opposite the hub.

14. A wind turbine as claimed in claim 1, further comprising a second vane being attached to each inner arm portion.

15. A wind turbine as claimed in claim 14, wherein the second vane is pitched permanently so as to catch the impinging wind thereby imparting rotation to the turbine.

16. A wind turbine as claimed in claim 1, wherein the biasing means is a combination stop and release means having a body which may be adjustably affixed to the outer arm portion, said body having spring loaded means near one end thereof engaging the vane and biasing it toward engagement with an edge of the other end of the body.

17. A wind turbine as claimed in claim 1, wherein each arm has a brace member extending from the end of the outer arm portion to the junction of the next adjacent inner and outer arm portions.

18. A wind turbine as claimed in claim 1, wherein each vane comprises a frame to which is attached a sheet material for catching the wind like a sail.

* * * * *